United States Patent
Polidi et al.

(10) Patent No.: US 6,542,814 B2
(45) Date of Patent: Apr. 1, 2003

(54) METHODS AND APPARATUS FOR DYNAMIC POINT OF INTEREST DISPLAY

(75) Inventors: Ari I. Polidi, Mountain View, CA (US); Gunda Govind, Santa Clara, CA (US)

(73) Assignee: Horizon Navigation, Inc., Santa Clara, CA (US)

( * ) Notice: Subject to any disclaimer, the term of this patent is extended or adjusted under 35 U.S.C. 154(b) by 0 days.

(21) Appl. No.: 09/801,476

(22) Filed: Mar. 7, 2001

(65) Prior Publication Data

US 2002/0138196 A1 Sep. 26, 2002

(51) Int. Cl.⁷ .................. G06F 165/00; G08G 1/123
(52) U.S. Cl. .................. 701/208; 701/211; 701/212; 701/200; 701/23; 701/113; 701/118; 340/990; 340/995; 345/133
(58) Field of Search .................. 701/208, 211, 701/212, 202, 200, 207, 23, 26, 209, 117, 118; 340/995, 990, 988; 345/133; 707/101

(56) References Cited

U.S. PATENT DOCUMENTS

| | | | |
|---|---|---|---|
| 5,208,590 A | 5/1993 | Pitts | 340/973 |
| 5,442,557 A | 8/1995 | Kaneko | 364/449 |
| 5,515,283 A | 5/1996 | Desai et al. | 364/443 |
| 5,911,773 A * | 6/1999 | Mutsuga et al. | 701/200 |
| 5,978,734 A | 11/1999 | Park | 701/211 |
| 6,006,161 A * | 12/1999 | Katou | 701/212 |
| 6,014,090 A | 1/2000 | Rosen et al. | 340/905 |
| 6,078,865 A | 6/2000 | Koyanagi | 701/211 |
| 6,091,956 A | 7/2000 | Hollenberg | 455/456 |
| 6,144,318 A * | 11/2000 | Hayashi et al. | 340/995 |
| 6,192,314 B1 * | 2/2001 | Khavakh et al. | 701/209 |
| 6,262,026 B1 * | 3/2001 | Nimura et al. | 701/211 |
| 6,212,472 B1 * | 4/2001 | Nonaka et al. | 701/208 |
| 6,259,987 B1 * | 7/2001 | Ceylan et al. | 701/200 |
| 6,374,180 B1 * | 4/2002 | Slominski et al. | 701/208 |

* cited by examiner

*Primary Examiner*—Thomas G. Black
*Assistant Examiner*—Tuan C To
(74) *Attorney, Agent, or Firm*—Beyer Weaver & Thomas, LLP

(57) ABSTRACT

The present invention provides a computer implemented method and apparatus for providing a display of points of interest in conjunction with a vehicle navigation system. According to one aspect of the present invention, a vehicle navigation system is provided and includes a processor configured to identify and display a plurality of points of interest with reference to a vehicle's location, and to repeat the display to reflect changes in the vehicle's location. In another embodiment, the vehicle navigation system includes a processor configured so that the plurality of points of interest identified is within a radius of the current position when the current location is within a densely digitized area. When the vehicle is not within a densely digitized area, the plurality of points of interest lie ahead along the current road within a second distance.

46 Claims, 10 Drawing Sheets

METHODS AND APPARATUS FOR DYNAMIC POINT OF INTEREST DISPLAY

BACKGROUND OF THE INVENTION

The present invention relates to vehicle navigation systems. More specifically, the invention relates to the improvements in the display of points of interest by vehicle navigation systems.

Vehicle navigation systems have become more prevalent in recent times. In conjunction with and sometimes in addition to the route calculation capabilities of the vehicle navigation system, landmarks and points of interest are referred to by the user. Typically vehicle navigation systems employ a map database wherein information such as digitized road segments, points of interest ("POI's"), landmarks, and similar location data are stored. Examples of points of interest and landmarks noteworthy to a user might include restaurants, hotels, motels, convention halls, tourist spots, museums, parking lots and automobile service facilities. Some vehicle navigation systems allow the user to input a point of interest as a destination for purposes of route calculation. For example, a user may have made reservations for dinner at a restaurant and might enter the restaurant name as the destination to allow the system to determine the best route to the destination.

Points of interest information is also provided in some systems as a user travels along a calculated route. For instance, vehicle drivers will often seek information as to the location of rest stops. Some current systems permit a display of rest stops within a predetermined radius of the vehicle's present location. The problem with such systems is that they ignore relevant factors in determining which rest stops are displayed. These factors might include the vehicle speed, the category of highway currently traversed by the vehicle, whether the rest stop lies along or near the calculated route, and whether the relative location of the rest stop has already been passed.

Current systems typically determine vehicle location through the use of satellite based global positioning systems, or dead reckoning systems which determine a vehicle location based on changes detected and measured from a known location. Data as to the present location are then compared with the data in the map database for the category of POI sought. FIG. 1 is a map diagram for illustrating an algorithm used by previous systems for determining POI's to display to the user. A vehicle 102 traveling in the direction indicated and seeking information as to a rest stop would be limited to the rest stops located within the map area 105 displayed. Even though vehicle 102 is traveling on road 107, constituting a major category of highway such as a freeway, the rest stops displayed would disregard this factor. The only ones displayed would be rest stop 110, located on road 109, a major highway parallel to the user's route, and 111, a stop already passed on the route. That is, the system would fail to display the rest stop information most useful to the user such as rest stop 112, located just beyond the area covered by the current map display 105 and on the same freeway route 107 and direction of the vehicle.

Consequently, what is needed is an improved method and apparatus for determining points of interest to be displayed on a vehicle navigation system. In addition, drivers may have interest in additional information regarding a specific point of interest or desire the display of POI's to be limited to specific categories or names. For example, a driver might be interested in the store hours for a specified category of store and perhaps additional information as to products offered by the store as well as sale items. Current systems deliver very limited information and often present the POI's in a listing containing all categories sorted only by distance from the present location. Therefore, what is further needed is a vehicle navigation system which can more intelligently display information regarding points of interest.

BRIEF SUMMARY OF THE INVENTION

To address the problems described above, the present invention provides methods and apparatus for presenting information regarding points of interest on vehicle navigation displays. Upcoming points of interest within a specified variable distance are dynamically displayed. In accordance with the present invention, the points of interest displayed are alternately determined in accordance with the vehicle's present location within a densely digitized area such as a city, its location along a more rural route, or whether the vehicle is travelling along a route calculated by the vehicle navigation system. To achieve the foregoing, the present invention provides a computer implemented method and apparatus for providing a display of a plurality of points of interest in conjunction with a vehicle navigation system. According to one aspect of the present invention, a vehicle navigation system is configured to identify and display a plurality of points of interest with reference to the vehicle location, and to automatically repeat the display of the plurality of points of interest to reflect changes in the vehicle location. The distance with reference to the vehicle location in one embodiment is determined by the vehicle speed. Filtering mechanisms are also provided wherein the displayed points of interest can be limited to user selected parameters or categories.

In another embodiment of the present invention, the vehicle navigation system is configured so that the plurality of points of interest identified is within a radius of the current position when the current location is within a densely digitized area. When the vehicle is not within a densely digitized area, the plurality of points of interest lie ahead along the current road within a second distance. When the vehicle navigation system is operating in navigation mode, the plurality of points lie within a third distance along the calculated route from the available points along the route.

In another aspect of the present invention, the vehicle navigation system is configured to identify a plurality of points of interest using a corridor corresponding to the vehicle location.

Computer implemented methods for identifying and displaying points of interest are also provided.

These and other features and advantages of the present invention are described below with reference to the drawings.

DETAILED DESCRIPTION OF THE INVENTION

Reference will now be made in detail to some specific embodiments of the invention. Examples of specific embodiments are illustrated in the accompanying drawings. While the invention will be described in conjunction with these specific embodiments, it will be understood that it is not intended to limit the invention to any particular specific embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
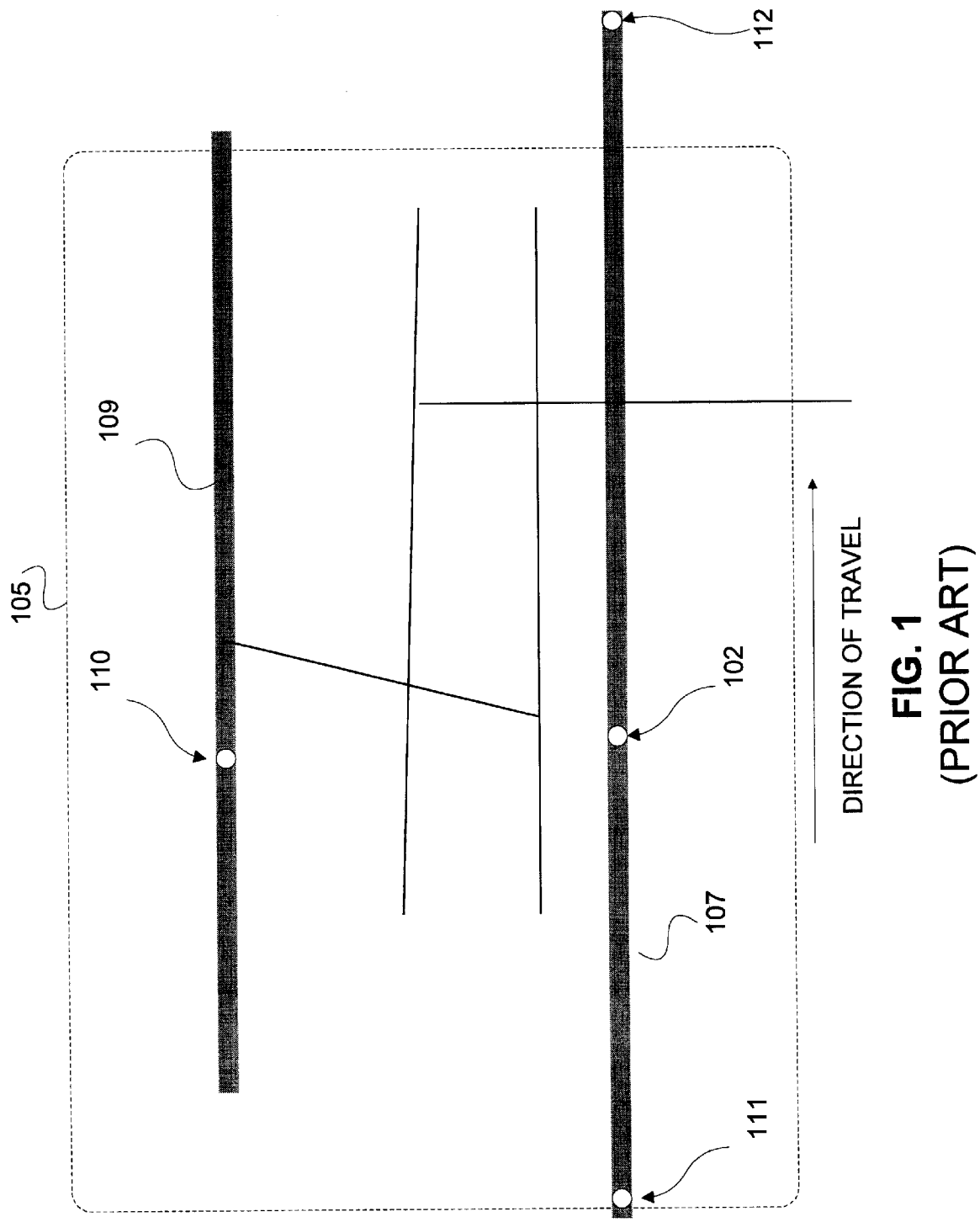
FIG. 1 is a map diagram illustrating identification of points of interest.
Figure 2:
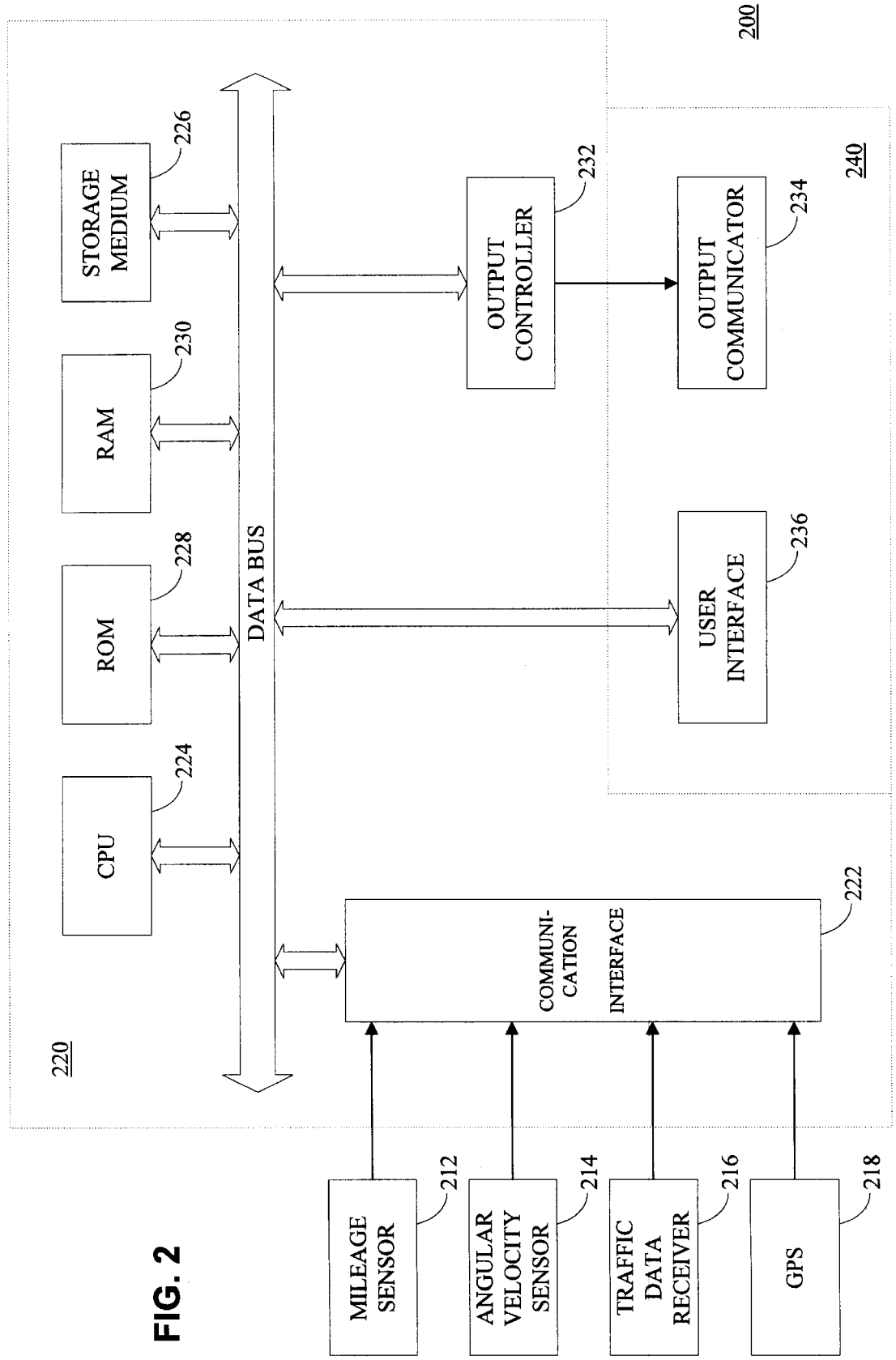
FIG. 2 is a block diagram of a vehicle navigation system for use with the present invention.

FIG. 2 is a block diagram of a specific embodiment of a vehicle navigation system 200 for use with the present invention. Sensors 212 and 214, traffic data receiver 216, and GPS receiver 218 are coupled to computing means 220 through sensor/GPS interface 222. In typical embodiments, mileage sensor 212 comprises an odometer, and angular velocity sensor 214 comprises a gyroscope, or a differential odometer coupled to the wheels of the vehicle. Traffic data receiver 216 may comprise any of a wide variety of RF receivers which are operable to receive real time traffic data transmitted in a variety of formats. A global positioning system (GPS) data receiver 218 is provided for receiving signals from, for example, a satellite-based navigation system. Data from sensor/GPS interface 222 is transmitted to CPU 224, which performs calibration, signal processing, dead-reckoning, vehicle positioning, and route calculation and guidance functions. A database containing map information may be stored in database medium 226, with software directing the operation of computing means 220 stored in main memory 228 for execution by CPU 224. Various embodiments of the present invention are embodied as such software. Memory 228 may comprise any of a wide variety of non-volatile memory such as, for example, read-only memory (ROM), reprogrammable non-volatile memory such as flash memory or SRAM, CD ROM, optical disk, or PCMCIA cards. System RAM 230 permits reading and writing of the information necessary to execute such software programs. Database medium 226 may comprise non-volatile memory, a hard disk drive, CD-ROM, or an integrated circuit in which digitized map information has been stored. Output controller 232, which may comprise a graphics controller, receives data processed by CPU 224 and transmits the data to display console 240 which includes output communicator 234, usually comprising a display screen with associated audio electronics and speakers. The user may input data, such as a desired destination, through user interface 236, typically comprising a keyboard. Alternatively user interface 236 may comprise a microphone coupled to speech recognition circuitry allowing a user to communicate with the system using voice commands.

The map database stored in database medium 226 preferably comprises positional data such as, for example, latitude and longitude coordinates, to describe road intersections or nodes, road segments, landmarks and points of interest, and other geographical information. The data base may further comprise data representing characteristics of roads or places on the map, such as road and place names, road features such as dividers, one-way restrictions, surface, speed limit, shape, elevation, and other properties. According to specific embodiments of the invention, the map database includes cost values associated with individual nodes and road segments. These cost values correspond to the estimates of time intervals for traversing the respective node or segment. Node cost values take into consideration such information as, for example, whether the vehicle would encounter oncoming traffic, thus delaying a left turn maneuver. Segment costs reflect road segment characteristics such as speed limit and segment length, both of which affect the travel time along the segment. Also associated with each road in the map database is a hierarchy value which relates to the category or type of the road. For example, the highest level category of the hierarchy includes freeways and expressways. The lowest level includes residential streets and/or alleys. The information stored in map database medium 226 is employed with the data received from interface 222 for route calculation and guidance.

Figure 3A:
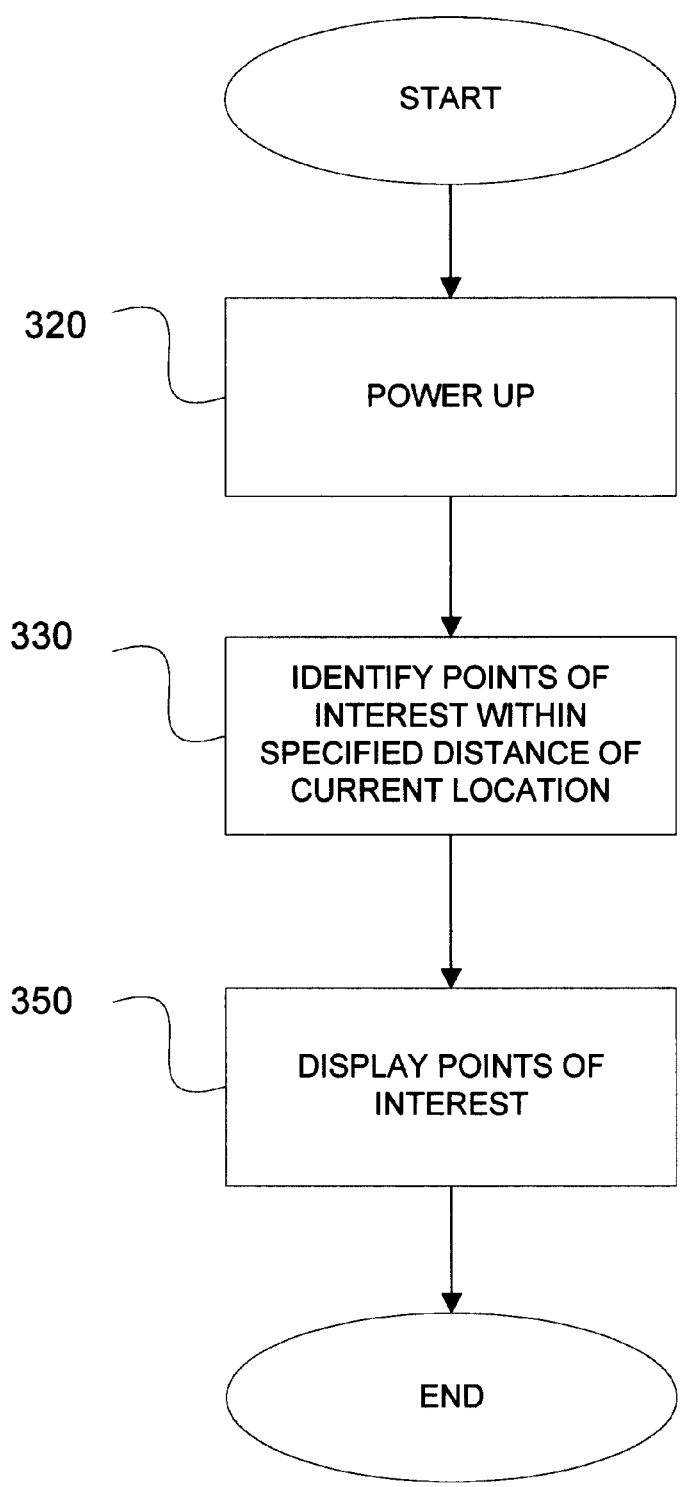
FIG. 3A is a flowchart illustrating a method of identifying and displaying points of interest in accordance with one embodiment of the present invention.
Figure 3B:
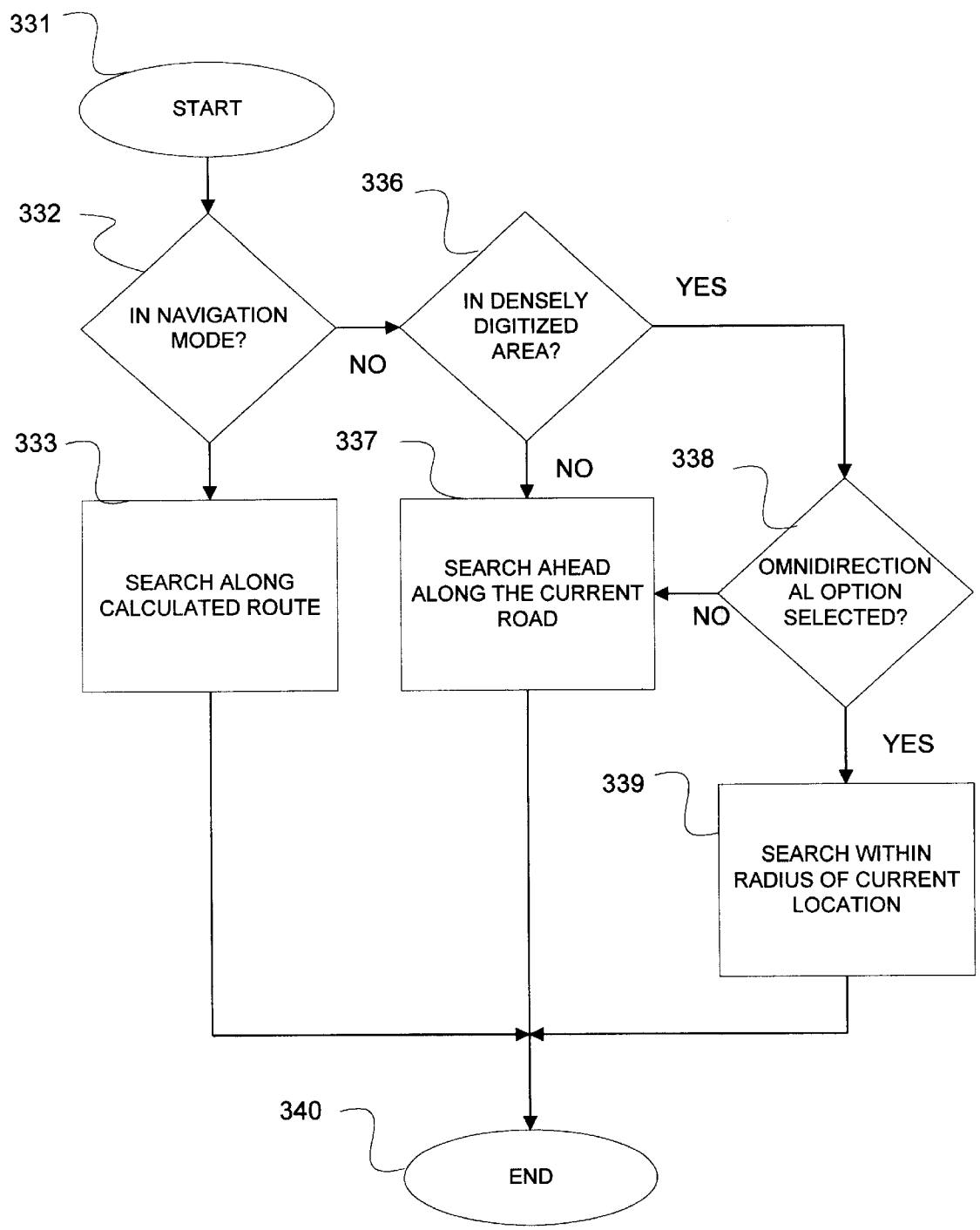
FIG. 3B is a flowchart illustrating in greater detail the method of identifying points of interest shown in FIG. 3A in accordance with a specific embodiment of the invention.

FIG. 3A is a flowchart illustrating the method of identifying and displaying points of interest in accordance with one embodiment of the present invention. Upon enabling this option of the navigation system, e.g. at power up (320), the system identifies points of interest within a specified distance of the current location (330). These points of interest will typically be stored as data in map database 226 but alternately could be stored in any form of internal or external memory, including flash memory and hard disk drives. Further details as to the procedures involved in determining the points of interest to be identified according to one embodiment are illustrated in FIG. 3B and described below. Once the appropriate points of interest are identified, they are displayed (350). In one embodiment, display of the POI's will automatically repeat to reflect the changes in the vehicle's location.

Figure 4A:
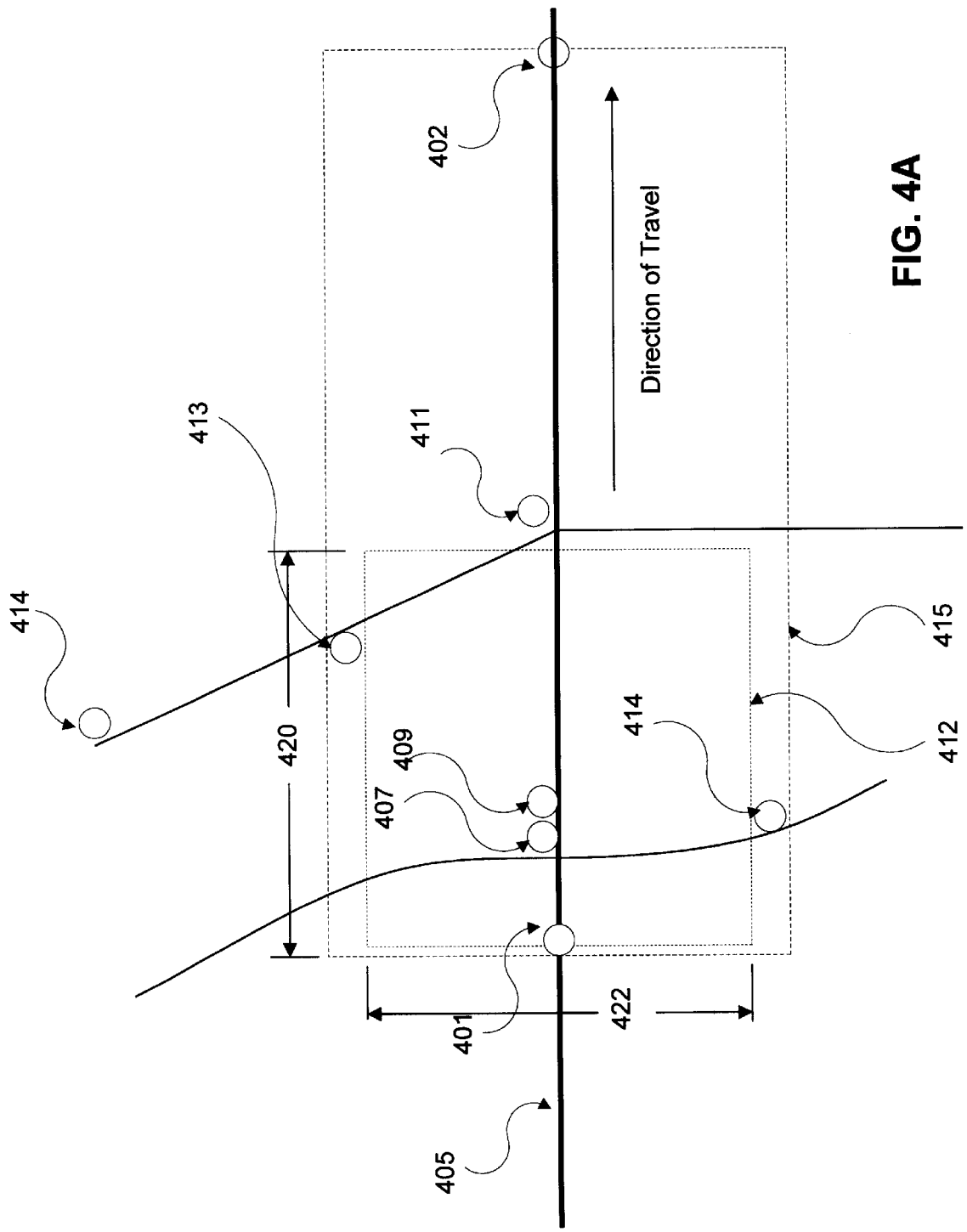
FIG. 4A illustrates points of interest identified in a corridor in accordance with one embodiment of the present invention.

A vehicle navigation system will typically display a map showing the vehicle's present position and several road segments in the vicinity of the vehicle. When operating in navigation mode, the segments will typically include portions of the navigation system's calculated route immediately ahead of and behind the vehicle. FIG. 3B illustrates a method for identifying the points of interest to be displayed according to a specific embodiment of the invention. Initially a determination is made as to whether the vehicle navigation system is in navigation mode with the vehicle following a predetermined route (332). If the vehicle is traversing such a route, a search for relevant POI's along the calculated route is made (333). As illustrated by FIG. 4A, where the vehicle at location 401 is travelling to destination 402 along calculated route which includes road 405, the POI's along the route would comprise, for example, POI's 407, 409, and 411. In a specific embodiment, the displayed POI's along the route would not include POI's falling outside a corridor associated with the route. For example, POI's 413 or 414 would not be displayed since they fall outside corridor 412. The dimensions of the corridor are either user defined or determined by the system according to various parameters as described below. Where the vehicle is not in navigation mode, the points of interest to be displayed is determined by whether the present location of the vehicle is in a densely digitized area (336). Where the vehicle's present location is not in a densely digitized area, a search is performed along the current road for points of interest. According to a specific embodiment, the search is limited to points of interest in the forward direction, i.e. ahead of the vehicle in the current direction of travel (337). Where the vehicle's present location is in a densely digitized area (336) and where an omnidirectional option has not been selected (338), a search is performed along the current road for points of interest, as described above.

Figure 4B:
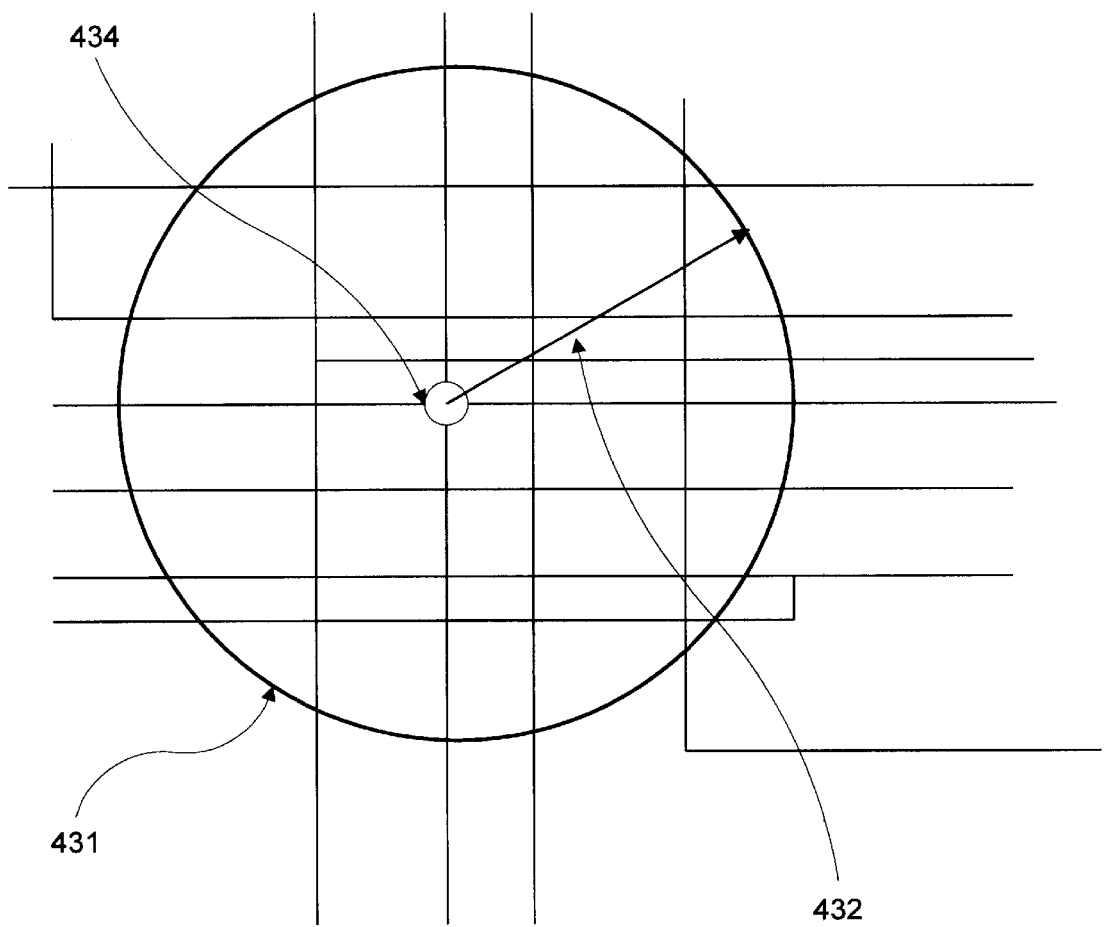
FIG. 4B illustrates points of interest identified within a predetermined radius in accordance with one embodiment of the present invention.

In one embodiment, and as shown in FIG. 3B, an optional omnidirectional option is available. In a densely digitized area, disablement of the omnidirectional option results in the search for POI's ahead along the current road (337). When the omnidirectional option is selected (338), the search is conducted within a predetermined or user-defined radius of the current location (339). As shown in FIG. 4B, POI's meeting the category criteria within circle 431 defined by radius 432 of vehicle location 434 are displayed, irrespective of the vehicle's direction of travel. According to various embodiments, this radius is a predetermined and programmable value. For example, in a densely digitized area, searches for fast food restaurants may be made within a one-half mile radius. This would include all POI's matching the category (fast food restaurants) in all directions within the specified radius. Options are available to the user to limit the selection of POI's by, for example, category or name or both. This filtering process is typically performed through a scrollable menu displayed on the output console and selected with soft keys. For example, the POI's selected by the user may be limited in one embodiment by both category and name, e.g. all fast food restaurants named Anderson's. The omnidirectional search option, therefore, enables the user to search for POI's or a selected category of POI in all directions when the user's vehicle lies in a densely digitized area. This situation occurs often in cities. Searches in such localities in all directions is preferred since typically, in urban areas, deviations from the direction of travel produce relatively minor effects on a total trip time as compared to similar deviations when the vehicle is traveling in a less densely digitized area, such as on a freeway or in a rural area. There are instances, however, where the vehicle could be located on a high speed route, such as a freeway, in a densely digitized area where the user would prefer the POI search be limited to the current route or those POI's within a predetermined distance of the current route, as will be described below. To facilitate this flexibility, the omnidirectional option could be disabled either by the user or automatically (e.g. in response to vehicle speed) as shown in FIG. 3B.

As illustrated in FIG. 4A, the POI's within a predetermined distance of the calculated route or the current route are identified using a corridor search. The corridor search displays all POI's within a predetermined distance of the current route or the calculated route. The corridor 415 extends forward from the vehicle's present location 401 to the destination 402 in one embodiment. In other embodiments, the user at his option, may limit the displayed POI's to a selected length of corridor 420 forward from the vehicle's present location. The corridor width 422 in one embodiment could be adjusted by the user or automatically according to various parameters such as speed and density of the digitized map data. In this situation, only those POI's falling within the corridor 412 defined by length 420 and width 422 would be displayed.

Figure 5A:
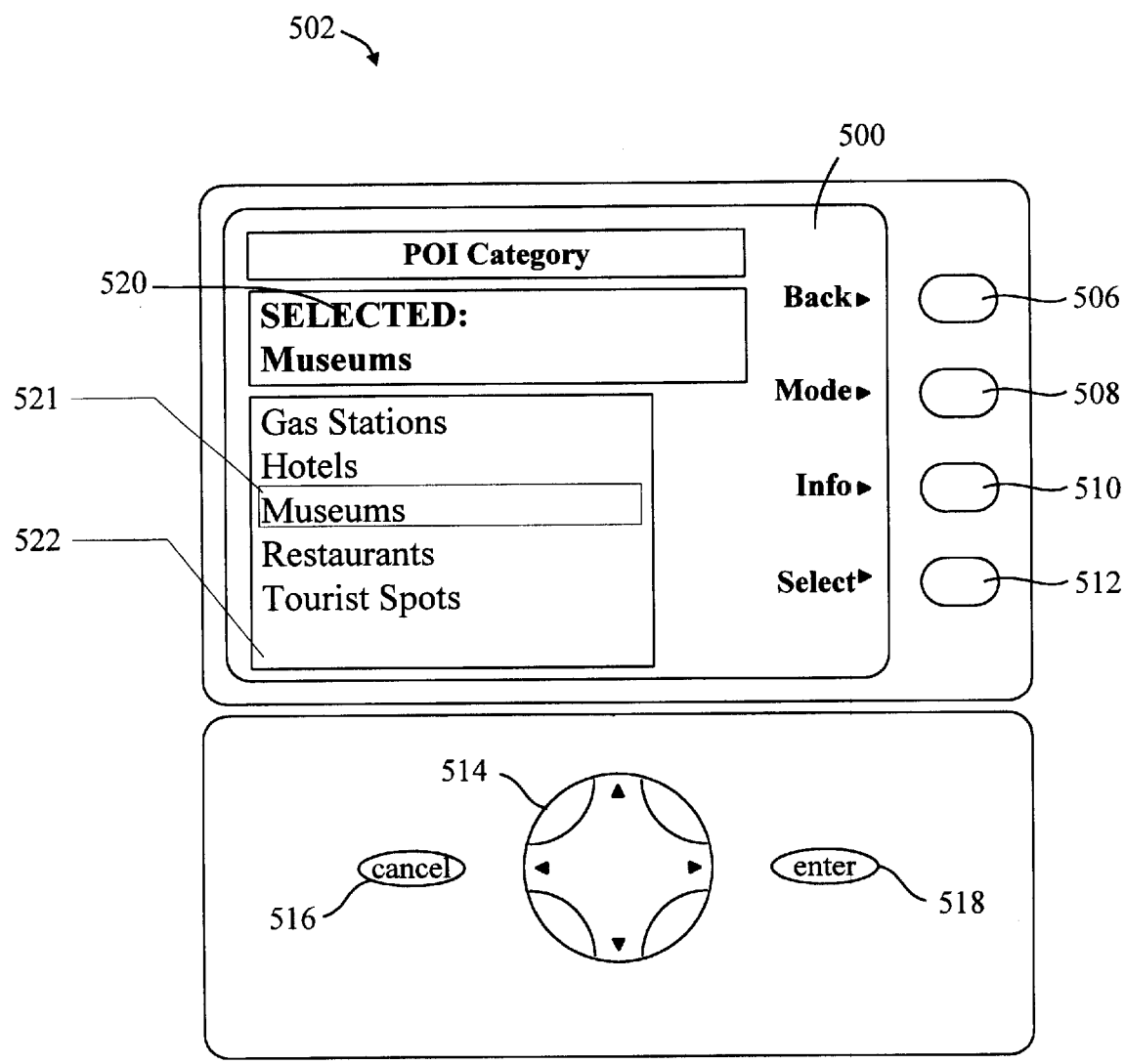
FIG. 5A illustrates a user input screen for identifying categories of points of interest in accordance with one embodiment of the present invention.

In a specific embodiment as illustrated by FIG. 5A, a "POI Category" GUI screen 500 is presented in user interface 502 in response to appropriate user manipulation of selected ones of keys 506–518. GUI 500 permits selection of a filtering mechanism to control the categories and names of displayed POI's. In FIG. 5A, the upper window 520 designates the category or name selected by the user in previously presented GUI screens. The selected category appears in highlighted section 521 which is scrollable in window 522.

Select key 512 enables the user to select the highlighted category entry for display by the system. The display console includes soft keys 506, 508, 510, and 512. The functions of these keys can vary according to the GUI screen presented. For example, In the POI category screen shown in FIG. 5A, back key 506 enables the user to go back to the previously displayed screen. According to various embodiments, selecting a POI category is accomplished by activating a soft key, through a touch sensitive screen for menu option selection, through an input keyboard, or by providing the appropriate voice command to be interpreted by voice recognition software.

It should be noted that the POI's displayed need not be limited to those appearing within the map area 105 shown on the vehicle navigation system's display console. In several embodiments the POI's displayed could be in a listing form or in a flashed message and would include relevant POI's outside of the display rectangle 105.

Figure 5B:
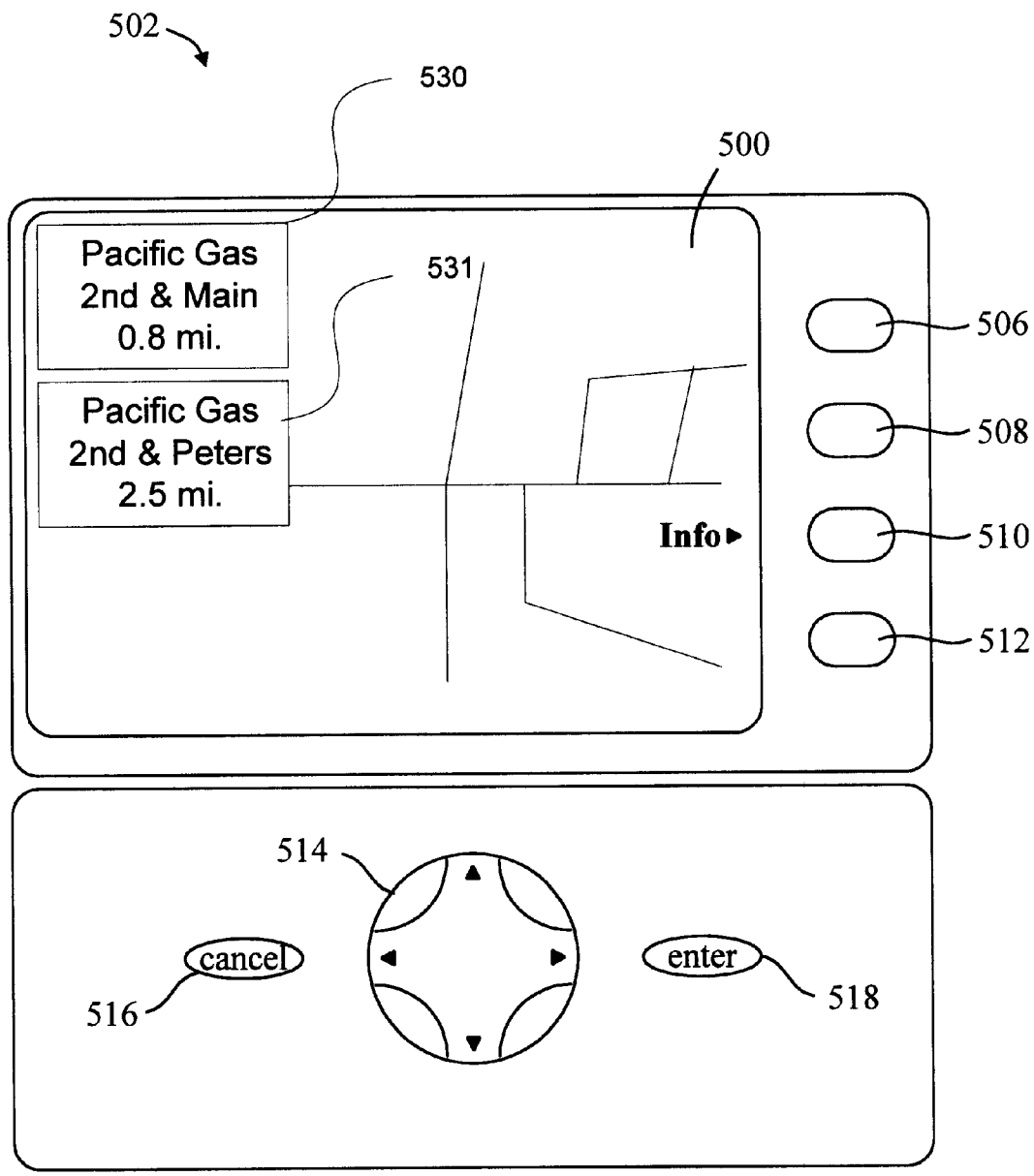
FIGS. 5B and 5C show various display screens for selected points of interest in accordance with another embodiment of the present invention.

In one embodiment, the category of POI or name selected by the user for filtering will result in a dynamic display of some number of the nearest POI's (e.g. 2 or 3). As shown in FIG. 5B, text boxes 530 and 531 display the names of the nearest gas stations, their addresses, and distances from the present location. The navigation system CPU will determine the frequency of refreshing this information to help prevent the screen changes from distracting the user. Other embodiments may include additional information in the text box which can be obtained from the database memory or provided to the system on an ongoing basis, for example, via the traffic information receiver connected to the system. Examples of such additional information might be a text advertisement or promotion from a store or restaurant falling within the user selected categories and in another embodiment would include updated information such as a daily special, e.g. "Pancake Breakfast $2.99".

According to one embodiment, the text messages are presented sequentially based on the present location of the vehicle. In other embodiments, several messages are concurrently displayed. For example, when gas stations constitute the selected category in one embodiment, the two nearest gas stations as represented in text boxes 530 and 531 are displayed concurrently. In another embodiment, these messages for the category displayed are presented dynamically with the CPU determining the POI's within the selected category which should be displayed at any one time. The new POI, as determined by distance and category or other filtering mechanism, supplants the most distant POI.

Figure 5C:
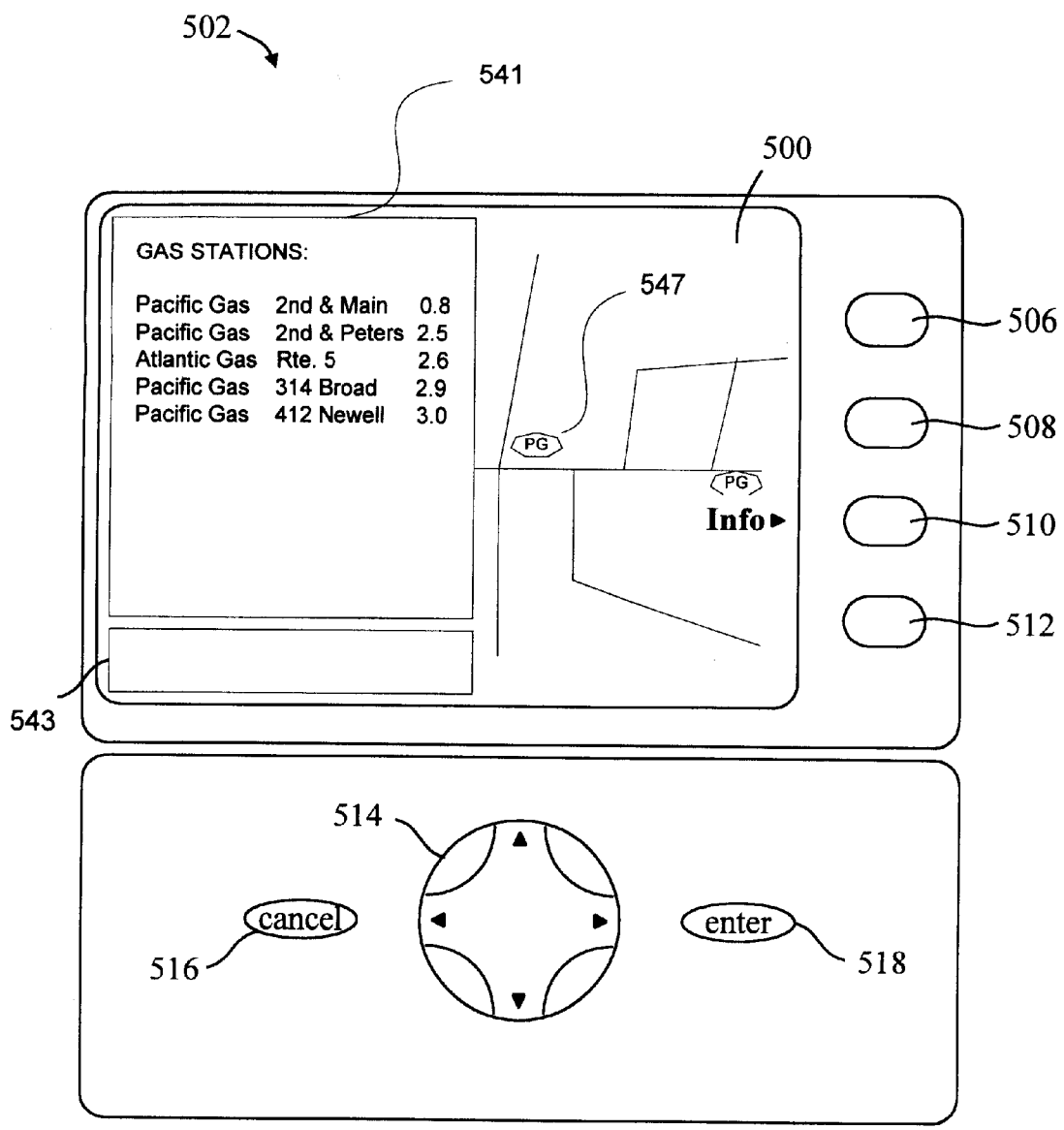

The present invention also embodies displaying the identified POI's in other formats. As shown in FIG. 5C, POI's filtered by the category or name or the both may be displayed in a listing fashion. The POI list 541 may include the basic address and distance information. In one embodiment, the listing is scrolled automatically by the processor as the vehicle location changes According to one embodiment, further information regarding an entry in the list can be obtained using rocker switch 514 to scroll a highlight bar through the list 541 and pressing the info key 510 which causes the information to be displayed in lower window 543. In another embodiment, the locations of the selected POI's can be displayed as icons in the system's map mode. For example, the icon 547 associated with the nearest POI within the selected category is displayed at its location on the map. The icon display may in another embodiment appear independently of any POI listing. The icon may be a symbol associated with the category, such as "G" for gas stations, or, as depicted in FIG. 5C, the icon may be a commercial logo.

The filtering mechanisms described limit the selection of POI's displayed according to the categories selected. According to various embodiments, vehicle speed is another factor which may be used to filter nearby POI's. Typically a driver traveling on a freeway at high speeds will have greater interest in POI's located closer to the calculated route at the expense of those which require travel several miles from a freeway exit ramp. A driver may be interested in travelling forward to find for example the desired restaurant in lieu of this off route travel of even a few miles. Another reason for adjusting filtering parameters at higher speeds is the sheer number of POI's which might flash through a listing or flash message display. Increased filtering is necessary to limit the POI's to a number which can be practically absorbed by the user. Although the identification steps have been described as applied to the identification of POI's and a corresponding display of those same identified POI's, the present invention is not so limited. The filtering methods described could be applied in some embodiments to a separate filtering process after the POI's are identified or in the same process wherein the POI's are identified.

Figure 6:
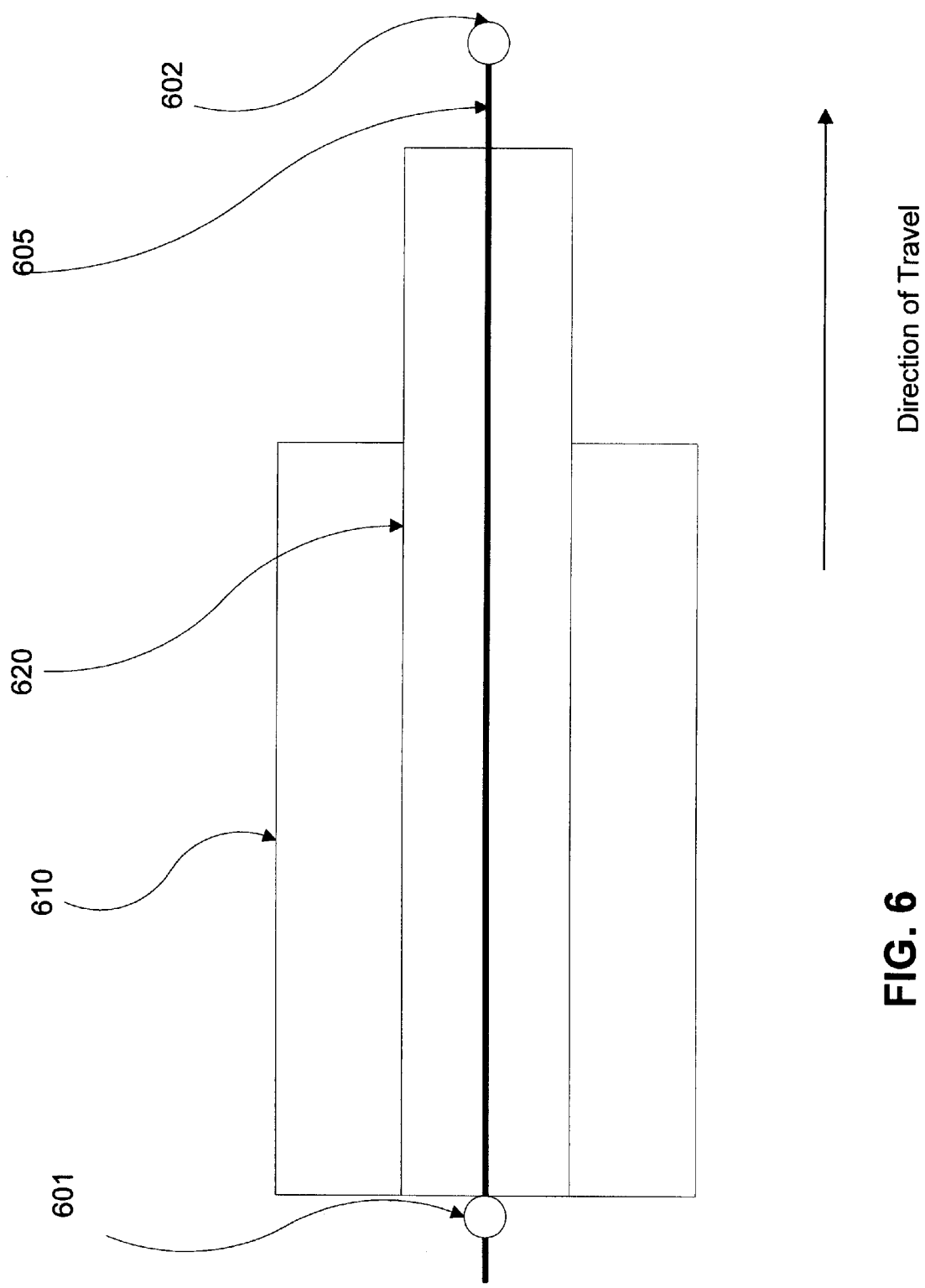
FIG. 6 illustrates adjusting of the corridor for the displayed POI's in accordance with another embodiment of the present invention.

FIG. 6 illustrates adjustment of the corridor width and length to affect the displayed POI's. The adjustment in one embodiment could occur in accordance with parameters specified by the user. In other embodiments, the processor is configured to adjust the corridor length and width according to certain parameters, such as the speed of the vehicle. Other example parameters may include the density of the digitized map database in the vicinity of the vehicle location or the number of matching POI's located in the corridor. A vehicle at present location 601 might at an example speed of 35 mph traveling toward destination 602 have POI's displayed within 1.0 mile of the route 605 on which it is travelling. The zone of interest for POI's would in this case be reflected by corridor 610. At a higher speed of 60 mph, corridor 620 (e.g. ¼ mile wide) would reflect the POI's displayed as a result of the automatic increase in filtering as a result of the decrease in width of the corridor in accordance with the increased speed parameter.

While the invention has been particularly shown and described with reference to specific embodiments, it will be understood by those skilled in the art that other details may be made without departing from the spirit or scope of the invention. For example, many different types of display and interface devices can be used other than those listed in the foregoing embodiments. Furthermore, certain terminology has been used to aid in the description of the embodiments but was not intended to limit the present invention. Therefore, in view of the foregoing, the scope of the invention should be determined by reference to the appended claims.

What is claimed is:

1. A vehicle navigation system comprising:
    at least one sensor for generating location data relating to a vehicle location;
    a memory for storing map data, the map data including points of interest data;
    a display; and
    a processor configured to:
        identify a plurality of points of interest with reference to the vehicle location and the points of interest data by performing in a first mode an omnidirectional search relative to the vehicle location in densely digitized regions, and in a second mode a corridor search relative to a road corresponding to the vehicle location in sparsely digitized regions;
        display the plurality of points of interest on the display; and
        automatically repeat display of the plurality of points of interest to reflect changes in the vehicle location.

2. The vehicle navigation system of claim 1 wherein the processor is configured to perform the search in the second mode along the road ahead of the vehicle position.

3. The vehicle navigation system of claim 2 wherein the processor is configured to perform the search in the second mode for a first distance along the road ahead of the vehicle position.

4. The vehicle navigation system of claim 3 wherein the first distance is determined with reference to vehicle speed.

5. The vehicle navigation system of claim 1 wherein the processor is configured to adjust a width of a corridor involved in the corridor search in accordance with at least one parameter.

6. The vehicle navigation system of claim 5 wherein the at least one parameter comprises vehicle speed.

7. The vehicle navigation system of claim 1 wherein the road corresponds to a previously calculated route, the processor being further configured to perform the search relative to the previously calculated route.

8. The vehicle navigation system of claim 7 wherein the processor is configured to identify the plurality of points of interest along all of the previously calculated route.

9. The vehicle navigation system of claim 7 wherein the processor is configured to repeat identification of the plurality of points of interest along the previously calculated route to reflect the changes in the vehicle position.

10. The vehicle navigation system of claim 1 wherein the processor is configured to operate in the second mode when the system is navigating along a previously calculated route.

11. The vehicle navigation system of claim 1 wherein the processor is configured to operate in the second mode when the vehicle location corresponds to a highway.

12. The vehicle navigation system of claim 1 wherein the processor is configured to display the plurality of points of interest as icons on a map grid on the display.

13. The vehicle navigation system of claim 12 wherein the icons comprise commercial logos associated with the plurality of points of interest.

14. The vehicle navigation system of claim 1 wherein the processor is configured to display the plurality of points of interest as text on the display.

15. The vehicle navigation system of claim 14 wherein the processor is further configured to scroll the text on the display.

16. The vehicle navigation system of claim 1 wherein the processor is configured to identify the plurality of points of interest with reference to at least one category selected by a user.

17. The vehicle navigation system of claim 16 wherein the at least one category includes at least one of restaurants, service stations, accommodations, and rest stops.

18. The vehicle navigation system of claim 1 wherein the processor is configured to identify the plurality of points of interest with reference to at least one business name selected by a user.

19. The vehicle navigation system of claim 1 wherein the processor is configured to display a promotion or advertisement associated with at least one of the plurality of points of interest.

20. The vehicle navigation system recited in claim 1 wherein at least one of the dimensions of a corridor involved in the corridor search are adjusted in accordance with at least one of the vehicle speed, density of digitized data, and the number of matching POI's located within the corridor.

21. A computer-implemented method for use with a vehicle navigation system comprising at least one sensor for generating location data relating to a vehicle location, a memory for storing map data, the map data including points of interest data, and a display, the method comprising:

identifying a plurality of points of interest with reference to the vehicle location and the points of interest data by performing in a first mode an omnidirectional search relative to the vehicle location in densely digitized regions, and in a second mode a corridor search relative to a road corresponding to the vehicle location in sparsely digitized regions;

displaying the plurality of points of interest on the display; and automatically repeating display of the plurality of points of interest to reflect changes in the vehicle location.

22. A computer program product comprising a computer readable medium having computer program instructions stored therein for performing the method of claim 21.

23. A vehicle navigation system comprising:

at least one sensor for generating location data relating to a vehicle location;

a memory for storing map data;

a display; and a processor configured to:

identify a plurality of points of interest using a corridor search of the map data in a corridor corresponding to a road corresponding to the vehicle location, wherein the corridor extends parallel to the road; and display the plurality of points of interest on the display.

24. The vehicle navigation system of claim 23 wherein the processor is configured to perform the corridor search along the road ahead of the vehicle position.

25. The vehicle navigation system of claim 24 wherein the processor is configured to perform the corridor search for a first distance along the road ahead of the vehicle position.

26. The vehicle navigation system of claim 25 wherein the first distance is determined with reference to vehicle speed.

27. The vehicle navigation system of claim 23 wherein the processor is alternatively configured to identify the plurality of points of interest using an omnidirectional search relative to the vehicle position in densely digitized regions.

28. The vehicle navigation system of claim 27 wherein the processor is configured to use the corridor search to identify the plurality of points of interest in densely digitized regions.

29. The vehicle navigation system of claim 27 wherein the processor is configured to use the corridor search to identify the plurality of points of interest when the system is navigating along a previously calculated route.

30. The vehicle navigation system of claim 27 wherein the processor is configured to use the corridor search to identify the plurality of points of interest when the vehicle location corresponds to a highway.

31. The vehicle navigation system of claim 23 wherein the processor is configured to adjust a width of a corridor corresponding to the corridor search in accordance with at least one parameter.

32. The vehicle navigation system of claim 31 wherein the at least one parameter comprises vehicle speed.

33. The vehicle navigation system of claim 23 wherein the road corresponds to a previously calculated route, the processor being further configured to perform the corridor search relative to the previously calculated route.

34. The vehicle navigation system of claim 33 wherein the processor is configured to identify the plurality of points of interest along all of the previously calculated route.

35. The vehicle navigation system of claim 33 wherein the processor is configured to repeat identification of the plurality of points of interest along the previously calculated route to reflect the changes in the vehicle position.

36. The vehicle navigation system of claim 23 wherein the processor is configured to display the plurality of points of interest as icons on a map grid on the display.

37. The vehicle navigation system of claim 36 wherein the icons comprise commercial logos associated with the plurality of points of interest.

38. The vehicle navigation system of claim 23 wherein the processor is configured to display the plurality of points of interest as text on the display.

39. The vehicle navigation system of claim 38 wherein the processor is further configured to scroll the text on the display.

40. The vehicle navigation system of claim 23 wherein the processor is configured to identify the plurality of points of interest with reference to at least one category selected by a user.

41. The vehicle navigation system of claim 40 wherein the at least one category includes at least one of restaurants, service stations, accommodations, and rest stops.

42. The vehicle navigation system of claim 31 wherein the processor is configured to identify the plurality of points of interest with reference to at least one business name selected by a user.

43. The vehicle navigation system of claim 31 wherein the processor is configured to display a promotion or advertisement associated with at least one of the plurality of points of interest.

44. The vehicle navigation system recited in claim 23 wherein at least one of the dimensions of the corridor are adjusted in accordance with at least one of the vehicle speed, density of digitized data, and the number of matching POI's located within the corridor.

45. A computer-implemented method for use with a vehicle navigation system comprising at least one sensor for generating location data relating to a vehicle location, a memory for storing map data, and a display, the method comprising identifying a plurality of points of interest using a corridor search of the map data in a corridor corresponding to a road corresponding to the vehicle location, wherein the corridor extends parallel to the road, and displaying the plurality of points of interest on the display.

46. A computer program product comprising a computer readable medium having computer program instructions stored therein for performing the method of claim 45.

* * * * *